United States Patent [19]

Lieberman

[11] Patent Number: 4,695,324

[45] Date of Patent: Sep. 22, 1987

[54] METHOD FOR PROCESSING COAL PREPARATION PLANT WASHINGS FOR ELIMINATION OF SLUDGE PONDS

[76] Inventor: Benjamin Lieberman, 901 Valley Rd., Charleston, W. Va. 25302

[21] Appl. No.: 569,224

[22] Filed: Jan. 9, 1984

[51] Int. Cl.⁴ .............................................. C04B 14/02
[52] U.S. Cl. ........................................ 106/96; 106/97; 106/900; 210/751
[58] Field of Search ................... 106/97, 900, 96; 210/751

[56] References Cited

U.S. PATENT DOCUMENTS

| | | | |
|---|---|---|---|
| 3,870,535 | 3/1975 | Minnick et al. | 106/900 |
| 4,015,997 | 4/1977 | Selmeczi et al. | 210/751 |
| 4,208,217 | 6/1980 | Anderson et al. | 106/97 |

FOREIGN PATENT DOCUMENTS 51-48759  4/1976  Japan .................................. 106/97

*Primary Examiner*—William R. Dixon, Jr.
*Assistant Examiner*—S. Capella

[57] ABSTRACT

The solids concentration obtained from the aqueous suspension derived from coal beneficiation plant streams can be promptly processed in stabilized load bearing mass by passing these solids plus proportionally added portland cement powder thru a temperature controlled pug mill. The product is then delivered to a fill area for disposal. This eliminates the need for ponds and permits the immediate reuse of water in the plant. Major economies in land purchases, waste treatment, water requirements, and operating costs are effected.

2 Claims, No Drawings

METHOD FOR PROCESSING COAL PREPARATION PLANT WASHINGS FOR ELIMINATION OF SLUDGE PONDS

In the hydraulic beneficiation of coal in coal preparation plants by the separation and removal of waste materials and coal fines as an aqueous suspension, the practice is to pump the aqueous suspension for storage and settlement of the suspended waste to ponds. Eventually, the supernatant water is returned for reuse. The waste removed as a suspension from the classification and washings generally contain clays, fine shale, pyrite and other impurities in finely divided form.

When the settled waste solids are removed from the pond for final disposal in a fill area, it is necessary to follow the legal requirements in the disposal: namely, that for every part land fill material which is below 20 percent solids concentration, there must be 2 parts earth cover. When land fill material is 40 percent or more solids concentration, the earth conver requirement is ½ part earth for 1 part fill. Consequently, three major cost factors are present: land purchase for ponds, labor and equipment for removal of settled solids from ponds, and landfill requirements.

The prior art consists in the conversion of the sludge from the aqueous suspension to a sedantary mass suitable for land fill by mixing granulated blast furnace slag in with the aqueous streams and then maintaining the mixture in the presence of excess water in a quiescent state whereby the solids settle and develop into a load supportive sedentary mass when removed and placed in a fill or any location.

The advantage and effectiveness of my development is based on concentrating the aqueous coal processing suspension streams to 50 percent or higher solids content. One convenient method for obtaining this concentration is to transfer the underflow from the cyclone separator which usually discharges 30-35 percent solids content to a second cyclone whereby a 65 percent or even higher solids content can be obtained. Based on volume of thruput, additional cyclones may be in series. Generally, the incorporation of slow speed agitator in the cyclones can produce 65 percent or higher solids concentration in two cyclones. However, other devices can be used to produce high concentrations of solids from suspensions.

Diaphram or other suitable pumps can transfer the concentrated solids at a fixed (but adjustable) rate to a steam jacket pug mill or similar mixer wherein portland cement is automatically at a 5 percent or higher rate in proportion to the solids content and with reference to the desired end use of the solids. The combination is intimately mixed for 2-5 minute retention time at 40°-70° C.

The table indicates the relationship between percent cement, percent solids, and temperature.

TABLE 1

| | Comparison of Setting Times with Different Solids Content and Different Temperatures | |
|---|---|---|
| | 35% Solids | 55% Solids |
| With 5% Cement at 65° F. | After mixing fluid then viscosity continued to increase | After mixing became firm in 2 hrs Continue to harden. |
| With 5% Cement at 149° F. | After mixing, semi solid in 60 min. Continued to harden | After mixing, semi solid in 2 minutes. Became firm when cool. |

I claim:

1. A method for solidifying coal waste suspensions from coal beneficiation processes, said method comprising:
   (i) mixing, in a heated mixer,
      (a) a coal waste suspension having a solids content of at least 50%, and
      (b) 5 to 20%, based on the weight of solids in the suspension (a), of portland cement;
   (ii) removing the heated mixture from the mixer after a 2 to 5 minute retention time; and
   (iii) cooling the removed mixture to produce a disposable solid.

2. The method of claim 1 where the mixing is done at a temperature of 40° to 70° C.

* * * * *